US010724627B2

(12) United States Patent
Oota et al.

(10) Patent No.: US 10,724,627 B2
(45) Date of Patent: Jul. 28, 2020

(54) CONTROL DEVICE FOR VEHICLE AND CONTROL METHOD FOR VEHICLE

(71) Applicant: JATCO Ltd, Fuji-shi, Shizuoka (JP)

(72) Inventors: Yusuke Oota, Ebina (JP); Yoshimasa Nishihiro, Zama (JP)

(73) Assignee: JATCO LTD, Fuji-Shi (JP)

(*) Notice: Subject to any disclaimer, the term of this patent is extended or adjusted under 35 U.S.C. 154(b) by 194 days.

(21) Appl. No.: 16/073,317

(22) PCT Filed: Jan. 27, 2017

(86) PCT No.: PCT/JP2017/003019
§ 371 (c)(1),
(2) Date: Jul. 26, 2018

(87) PCT Pub. No.: WO2017/135172
PCT Pub. Date: Aug. 10, 2017

(65) Prior Publication Data
US 2019/0032773 A1 Jan. 31, 2019

(30) Foreign Application Priority Data

Feb. 4, 2016 (JP) ................. 2016-019762

(51) Int. Cl.
F16H 59/54 (2006.01)
F16H 59/74 (2006.01)
(Continued)

(52) U.S. Cl.
CPC .............. F16H 59/54 (2013.01); B60W 10/02 (2013.01); F16H 59/74 (2013.01); F16H 61/02 (2013.01); F16H 61/0267 (2013.01);
F16H 61/0403 (2013.01); F16H 63/50 (2013.01); B60W 2540/10 (2013.01); B60W 2540/12 (2013.01);
(Continued)

(58) Field of Classification Search
None
See application file for complete search history.

(56) References Cited

U.S. PATENT DOCUMENTS 5,161,174 A * 11/1992 Pigozzi ........... B60W 30/18136
340/456
9,028,354 B2 * 5/2015 Johnson ................ B60W 10/06
475/72
(Continued)

FOREIGN PATENT DOCUMENTS

JP 2013-213557 A 10/2013
JP 2014-234837 A 12/2014
JP 2015-148321 A 8/2015

Primary Examiner — Colby M Hansen
(74) Attorney, Agent, or Firm — Foley & Lardner LLP

(57) ABSTRACT

A control device for a vehicle is provided, which vehicle includes a driving source, a driven machine driven by the driving source, and an automatic transmission having a torque converter provided downstream of the driving source in a power transmission path and having a lockup clutch, and an engaging element provided downstream of the torque converter in the power transmission path. The device includes a control unit adapted to engage the engaging element in a state where the lockup clutch is engaged if a brake pedal is stepped on during neutral running control in which the automatic transmission is brought into a power shut-off state during running of the vehicle.

10 Claims, 5 Drawing Sheets

(51) Int. Cl.
*F16H 63/50* (2006.01)
*F16H 61/02* (2006.01)
*B60W 10/02* (2006.01)
*F16H 61/04* (2006.01)

(52) U.S. Cl.
CPC ............... *B60W 2710/0666* (2013.01); *B60W 2710/1005* (2013.01)

(56) References Cited

U.S. PATENT DOCUMENTS

| | | | | |
|---|---|---|---|---|
| 2002/0032097 | A1* | 3/2002 | Koelle | B60K 6/48 |
| | | | | 477/3 |
| 2015/0274170 | A1* | 10/2015 | Sun | B60K 23/02 |
| | | | | 477/92 |
| 2016/0273461 | A1* | 9/2016 | Cousins | F02D 29/02 |
| 2018/0180168 | A1* | 6/2018 | Peterson | B60W 10/06 |

\* cited by examiner

CONTROL DEVICE FOR VEHICLE AND CONTROL METHOD FOR VEHICLE

TECHNICAL FIELD

The present invention relates to a control device for a vehicle and a control method for a vehicle.

BACKGROUND ART

JP2013-213557 discloses a control device for a vehicle adapted to execute so-called sailing-stop control in which, when a predetermined condition is met, a clutch is disengaged so that an automatic transmission is brought into a neutral state (power shut-off state) and a vehicle is made to run while a driving source is stopped.

SUMMARY OF INVENTION

If a brake pedal is stepped on during sailing-stop control, it is preferable that the sailing-stop control is cancelled, and rotation of a driving wheel is transmitted to driven machines such as an alternator and an oil pump so that the driven machines are quickly operated.

Such a request can occur not only when the sailing-stop control is to be cancelled but also in a case where, in neutral running control in general in which a clutch is disengaged during running to bring an automatic transmission to a neutral state, a brake pedal is stepped on during execution of the neutral running control.

The present invention has an object to cause a driven machine to be operated quickly if a brake pedal is stepped on during neutral running control.

In one aspect of the present invention, a device of controlling a vehicle is provided, which vehicle includes a driving source, a driven machine driven by the driving source, and an automatic transmission having a torque converter provided downstream of the driving source and the driven machine in a power transmission path and having a lockup clutch, and an engaging element provided downstream of the torque converter in the power transmission path. In this aspect, the device includes a control unit adapted to engage the engaging element in a state where the lockup clutch is engaged if a brake pedal is stepped on during neutral running control in which the automatic transmission is brought into a power shut-off state during running of the vehicle.

In another aspect of the present invention, a method for controlling a vehicle is provided, which vehicle includes a driving source, a driven machine driven by the driving source, and an automatic transmission having a torque converter provided downstream of the driving source and the driven machine in a power transmission path and having a lockup clutch, and an engaging element provided downstream of the torque converter in the power transmission path. In this aspect, the engaging element is engaged in a state where the lockup clutch is engaged if a brake pedal is stepped on during neutral running control in which the automatic transmission is brought into a power shut-off state during running of the vehicle.

According to the aforementioned aspects, when the brake pedal is stepped on during the neutral running control, the engaging element is engaged in a state where the lockup clutch is engaged, and thus the driven machine can be quickly operated after the engaging element is engaged.

DESCRIPTION OF EMBODIMENTS

An embodiment of the present invention will be described below by referring to the attached drawings. In the following, a speed ratio is a value obtained by dividing a rotation speed of an input shaft of a continuously variable transmission by a rotation speed of an output shaft of the continuously variable transmission.

Figure 1:
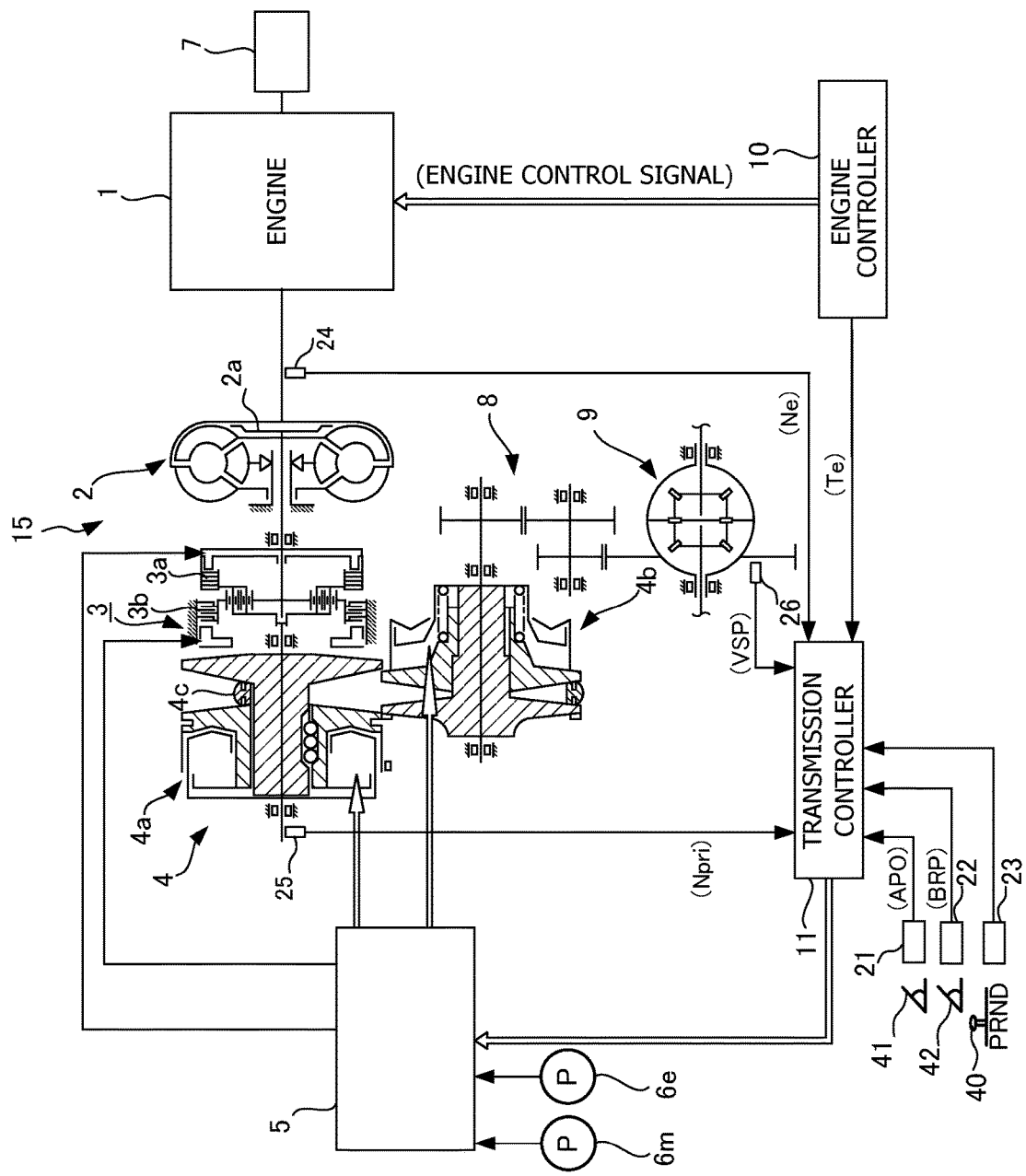
FIG. 1 is an outline configuration diagram of a vehicle according to an embodiment of the present invention.

FIG. 1 is an outline configuration diagram of a vehicle of this embodiment. The vehicle includes an engine 1, a torque converter 2, a forward/reverse switching mechanism 3, a continuously variable transmission (variator) 4, a hydraulic control circuit 5, a mechanical oil pump 6m, an electric oil pump 6e, an alternator 7, an engine controller 10, and a transmission controller 11.

In the vehicle, rotation generated in the engine 1 is transmitted to a driving wheel, not shown, via the torque converter 2, the forward/reverse switching mechanism 3, the continuously variable transmission 4, a gear set 8, and a differential gear device 9. That is, in a power transmission path with the engine 1 side as an upstream and the driving wheel side as a downstream, rotation of the engine 1 is transmitted from the upstream to the downstream. An automatic transmission 15 is constituted by the torque converter 2, the forward/reverse switching mechanism 3 and the continuously variable transmission 4.

The torque converter 2 has a lockup clutch 2a, and when the lockup clutch 2a is engaged, an input shaft and an output shaft of the torque converter 2 are directly coupled, and the input shaft and the output shaft are rotated at the same speed.

The forward/reverse switching mechanism 3 has a double-pinion planetary gear set as a main constituent element and couples its sun gear to the engine 1 through the torque converter 2 and couples a carrier to a primary pulley 4a. The forward/reverse switching mechanism 3 further includes a forward clutch 3a for directly coupling the sun gear and the carrier of the double-pinion planetary gear set and a reverse brake 3b for fixing a ring gear, transmits input rotation from the engine 1 via the torque converter 2 to the primary pulley 4a as it is when the forward clutch 3a is engaged, and transmits the input rotation from the engine 1 via the torque converter 2 to the primary pulley 4a under reverse speed reduction when the reverse brake 3b is engaged.

As states of the forward clutch 3a and the reverse brake 3b, there are "disengaged", "standby", "slip" and "engaged" states. These states are switched in accordance with a hydraulic pressure supplied to each piston pressure receiving chamber.

The "disengaged" is a state where the hydraulic pressure is not supplied to the forward clutch 3a, and the forward clutch 3a does not have a torque capacity, for example.

The "standby" is a state where the forward switch 3a does not have a torque capacity though the hydraulic pressure is supplied to the forward clutch 3a, for example. In the "standby" state, the forward clutch 3a is in a state immediately before it has the torque capacity.

The "slip" is a state where the hydraulic pressure is supplied to the forward clutch 3a, the forward clutch 3a has the torque capacity, and a rotation speed difference considering a speed ratio R1 of the forward/reverse switching mechanism 3 when the forward clutch 3a is engaged is generated between the input/output shafts of the forward/reverse switching mechanism 3, for example. In the "slip" state, the torque capacity is smaller than an input torque of the forward clutch 3a.

The "engaged" is a state where the hydraulic pressure is supplied to the forward clutch 3a, the forward clutch 3a has the torque capacity, and the rotation speed difference considering the speed ratio R1 of the forward/reverse switching mechanism 3 when the forward clutch 3a is engaged is not generated between the input/output shafts of the forward/reverse switching mechanism 3, for example. In the "engaged" state, the torque capacity is larger than an input torque of the forward clutch 3a. The "engaged" state includes complete engagement in which the torque capacity has an allowance for the input torque by increasing the torque capacity after the torque capacity becomes larger than the input torque of the forward clutch 3a.

The continuously variable transmission 4 includes the primary pulley 4a, a secondary pulley 4b, and a belt 4c. In the continuously variable transmission 4, the hydraulic pressure supplied to the primary pulley 4a and the hydraulic pressure supplied to the secondary pulley 4b are controlled so that a contact radius between each of the pulleys 4a and 4b and the belt 4c is changed, and a speed ratio of the continuously variable transmission 4 is changed.

The mechanical oil pump 6m is a mechanical oil pump driven by an input of rotation of the output shaft of the engine 1. That is, the mechanical oil pump 6m is a driven machine. Oil ejected from the mechanical oil pump 6m by the driving of the mechanical oil pump 6m is supplied to the hydraulic control circuit 5. When the engine 1 is stopped, the mechanical oil pump 6m is not driven, and the oil is not ejected from the mechanical oil pump 6m.

The electric oil pump 6e is an electric oil pump driven by supply of electricity from a battery, not shown. By driving the electric oil pump 6e if the mechanical oil pump 6m is not driven, the oil can be supplied to the hydraulic control circuit 5 even while the engine is stopped.

The alternator 7 is driven by an input of the rotation of the output shaft of the engine 1. That is, the alternator 7 is a driven machine.

The hydraulic control circuit 5 is constituted by a plurality of channels, a plurality of hydraulic actuators and the like. The hydraulic actuator is constituted by a solenoid and a hydraulic control valve. In the hydraulic control circuit 5, the hydraulic actuator is controlled on the basis of a control signal from the transmission controller 11, a supply path of the hydraulic pressure is switched, and a required hydraulic pressure is adjusted from a line pressure generated by oil ejected from the mechanical oil pump 6m and the electric oil pump 6e. The hydraulic control circuit 5 supplies the adjusted hydraulic pressure to each portion of the continuously variable transmission 4, the forward/reverse switching mechanism 3, and the torque converter 2.

The transmission controller 11 is constituted by a CPU, a ROM, a RAM and the like and controls an operation of the automatic transmission 15. In the transmission controller 11, a function of the transmission controller 11 is exerted by reading and executing a program stored in the ROM by the CPU. The engine controller 10 is also constituted by a CPU, a ROM, a RAM and the like.

To the transmission controller 11, a signal from an accelerator pedal opening sensor 21 for detecting an accelerator pedal opening APO corresponding to an operation amount of an accelerator pedal 41, a signal from a brake fluid pressure sensor 22 for detecting a brake fluid pressure BRP corresponding to an operation amount of a brake pedal 42, and a signal from an inhibitor switch 23 for detecting a position of a shift lever 40 are input. Moreover, to the transmission controller 11, a signal from an engine rotation speed sensor 24 for detecting an engine rotation speed Ne which is a rotation speed of an output shaft of the engine 1, a signal from a primary rotation speed sensor 25 for detecting a primary rotation speed Npri which is a rotation speed (a rotation speed on an output side of the forward/reverse switching mechanism 3) of the primary pulley 4a of the continuously variable transmission 4, a signal from a vehicle speed sensor 26 for detecting a vehicle speed VSP, a signal related to an engine torque Te from the engine controller 10 controlling an operation of the engine 1 and the like are input.

In this embodiment, if a sailing-stop condition is met during running of a vehicle, sailing-stop control is executed in which fuel injection to the engine 1 is stopped and the engine 1 is stopped, and the forward clutch 3a and the reverse brake 3b of the forward/reverse switching mechanism 3 are disengaged, and the automatic transmission 15 is brought into the neutral state. During the sailing-stop control, the lockup clutch 2a is disengaged.

As a result, an inertia running distance in the state where the engine 1 is stopped is prolonged, and fuel efficiency of the engine 1 can be improved.

The sailing-stop conditions are as follows, for example:
(a) The shift lever 40 is at a D range.
(b) The vehicle speed VSP is not lower than a first predetermined vehicle speed V1.
(c) The accelerator pedal 41 has not been stepped on.
(d) The brake pedal 42 has not been stepped on.

The first predetermined vehicle speed V1 is a medium or high vehicle speed and is set in advance.

The sailing-stop condition is met when all the aforementioned (a) to (d) conditions are satisfied and is not met if any one of the aforementioned (a) to (d) is not satisfied.

If the sailing-stop condition is not met anymore during the sailing-stop control, the sailing-stop control is cancelled, the engine 1 is started, and the forward clutch 3a is engaged. That is, the sailing-stop condition is also a sailing-stop cancellation condition for canceling the sailing-stop control. The sailing-stop condition and the sailing-stop cancellation condition may be different conditions.

When the sailing-stop cancellation condition is met, the engine 1 is started, and after the sailing-stop cancellation control in which the forward clutch 3a is engaged is executed, normal running control is executed. In the sailing-stop cancellation control, after execution of rotation synchronization control in which the engine 1 is started and rotation speeds before and after the forward clutch 3a are synchronized, engagement control in which the forward clutch 3a is engaged is executed. The sailing-stop control, the sailing-stop cancellation control (rotation synchronization control, engagement control) and the like are executed by the transmission controller 11 and the engine controller 10.

During the sailing-stop control, the forward/reverse switching mechanism 3 is in a power shut-off state, and the automatic transmission 15 is in the neutral state. Moreover, since the engine 1 is stopped, the mechanical oil pump 6m is not driven. Thus, during the sailing-stop control, a required hydraulic pressure is supplied to the vehicle by using the oil ejected from the electric oil pump 6e.

Figure 2:
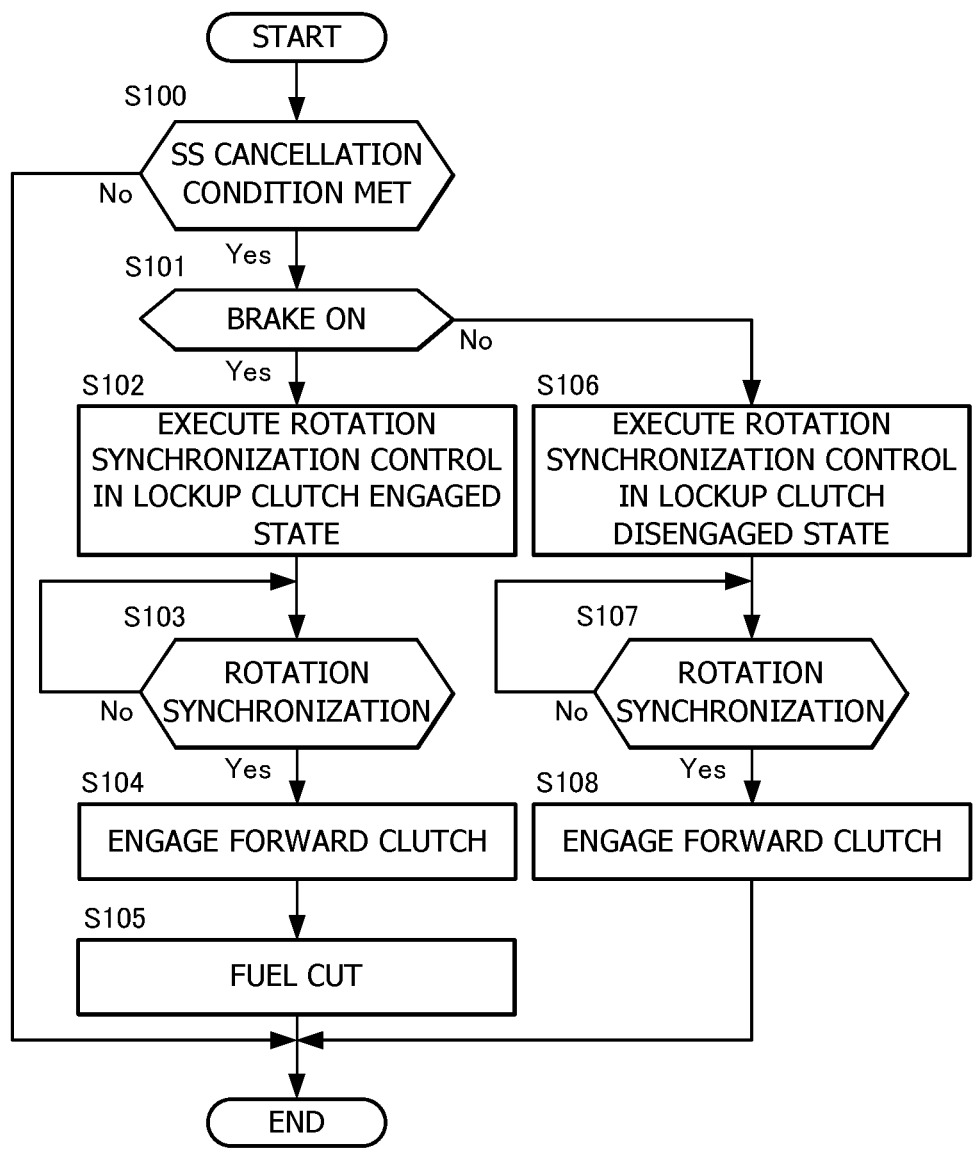
FIG. 2 is a flowchart when sailing-stop control is cancelled in the embodiment.

Subsequently, a case where the sailing-stop control is to be cancelled will be described by using a flowchart in FIG. 2. When the processing illustrated in FIG. 2 is to be started, it is assumed that the sailing-stop control is being executed.

At Step S100, the transmission controller 11 determines whether the sailing-stop cancellation condition (SS cancellation condition) is met or not. Specifically, the transmission controller 11 determines whether any one of the aforementioned (a) to (d) is not satisfied anymore. If the sailing-stop cancellation condition is met, the processing goes to Step S101, while if the sailing-stop cancellation condition is not met, the processing this time is finished.

At Step S101, the transmission controller 11 determines whether the brake pedal 42 has been stepped on or not. Whether the brake pedal 42 has been stepped on or not is detected on the basis of a signal from the brake fluid pressure sensor 22, and if the brake fluid pressure is higher than a predetermined pressure, it is determined that the brake pedal 42 has been stepped on. If the brake pedal 42 has been stepped on, the processing goes to Step S102. On the other hand, if the brake pedal 42 has not been stepped on, the processing goes to Step S106.

At Step S102, the transmission controller 11 and the engine controller 10 execute the sailing-stop cancellation control. Specifically, the transmission controller 11 engages the lockup clutch 2a, and the engine controller 10 starts the engine 1. That is, an engagement instruction is output to the lockup clutch 2a, and a start instruction of the engine 1 is output. As described above, the rotation synchronization control is executed in the state where the lockup clutch 2a is engaged. If the brake pedal 42 is stepped on, in order to execute fuel cut immediately, the lockup clutch 2a is engaged before the forward clutch 3a is rotation-synchronized, though the details will be described later.

At Step S103, the transmission controller 11 determines whether the forward clutch 3a has rotation-synchronized or not. Specifically, the transmission controller 11 determines whether a relationship between the engine rotation speed Ne and the primary rotation speed Npri satisfies an equation (1) or not. The engine rotation speed Ne is detected on the basis of a signal from the engine rotation speed sensor 24. The primary rotation speed Npri is detected on the basis of a signal from the primary rotation speed sensor 25.

$$|Ne-(R1 \times Npri)| \leq N1 \quad (1)$$

Reference character "R1" denotes a speed ratio of the forward/reverse switching mechanism 3 when the forward clutch 3a is engaged. Reference character "N1" denotes a first threshold value set in advance and is a value at which such determination can be made that occurrence of an engagement shock can be suppressed when the forward clutch 3a is engaged in a state where the lockup clutch 2a is engaged. The first threshold value N1 is smaller than a second threshold value N2 which will be described later.

In this embodiment, since a turbine rotation speed of the torque converter 2 (a rotation speed Nin on an input side of the forward/reverse switching mechanism 3) is not detected, whether the forward clutch 3a has rotation-synchronized or not is determined by using the engine rotation speed Ne and the primary rotation speed Npri.

If the equation (1) is satisfied, the transmission controller 11 determines that the forward clutch 3a has rotation-synchronized, while if the equation (1) is not satisfied, it determines that the forward clutch 3a has not rotation-synchronized. Stepping-on of the brake pedal 42 lowers the primary rotation speed Npri, while start of the engine 1 heightens the engine rotation speed Ne. When it is determined that the forward clutch 3a has rotation-synchronized, the processing goes to Step S104.

At Step S104, the transmission controller 11 finishes the rotation synchronization control and executes the engagement control. The transmission controller 11 heightens the hydraulic pressure supplied to the forward clutch 3a and engages the forward clutch 3a.

At Step S105, the engine controller 10 executes fuel cut for stopping fuel injection to the engine 1. As a result, the alternator 7 is driven by the rotation transmitted from the driving wheel, and alternator regeneration is executed. Electricity generated by alternator regeneration is accumulated in a battery.

At Step S106, the engine controller 10 starts the engine 1. If the brake pedal 42 has not been stepped on, the rotation synchronization control is executed in the state where the lockup clutch 2a is disengaged.

At Step S107, the transmission controller 11 determines whether the forward clutch 3a has rotation-synchronized or not. Specifically, the transmission controller 11 determines whether the relationship between the engine rotation speed Ne and the primary rotation speed Npri satisfies an equation (2) or not.

$$|Ne-(R1 \times Npri)| \leq N2 \quad (2)$$

Reference character "N2" denotes a second threshold value set in advance and is a value at which it can be determined that occurrence of an engagement shock can be suppressed when the forward clutch 3a is engaged in the state where the lockup clutch 2a is disengaged. The second threshold value N2 is larger than the first threshold value N1.

If the equation (2) is satisfied, the transmission controller 11 determines that the forward clutch 3a has rotation-synchronized, while if the equation (2) is not satisfied, it determines that the forward clutch 3a has not rotation-synchronized. When the engine rotation speed Ne is heightened by the start of the engine 1 and it is determined that the forward clutch 3a has rotation-synchronized, the processing goes to Step S108.

At Step S108, the transmission controller 11 finishes the rotation synchronization control and executes the engagement control. The transmission controller 11 heightens the hydraulic pressure supplied to the forward clutch 3a and engages the forward clutch 3a.

Figure 3:
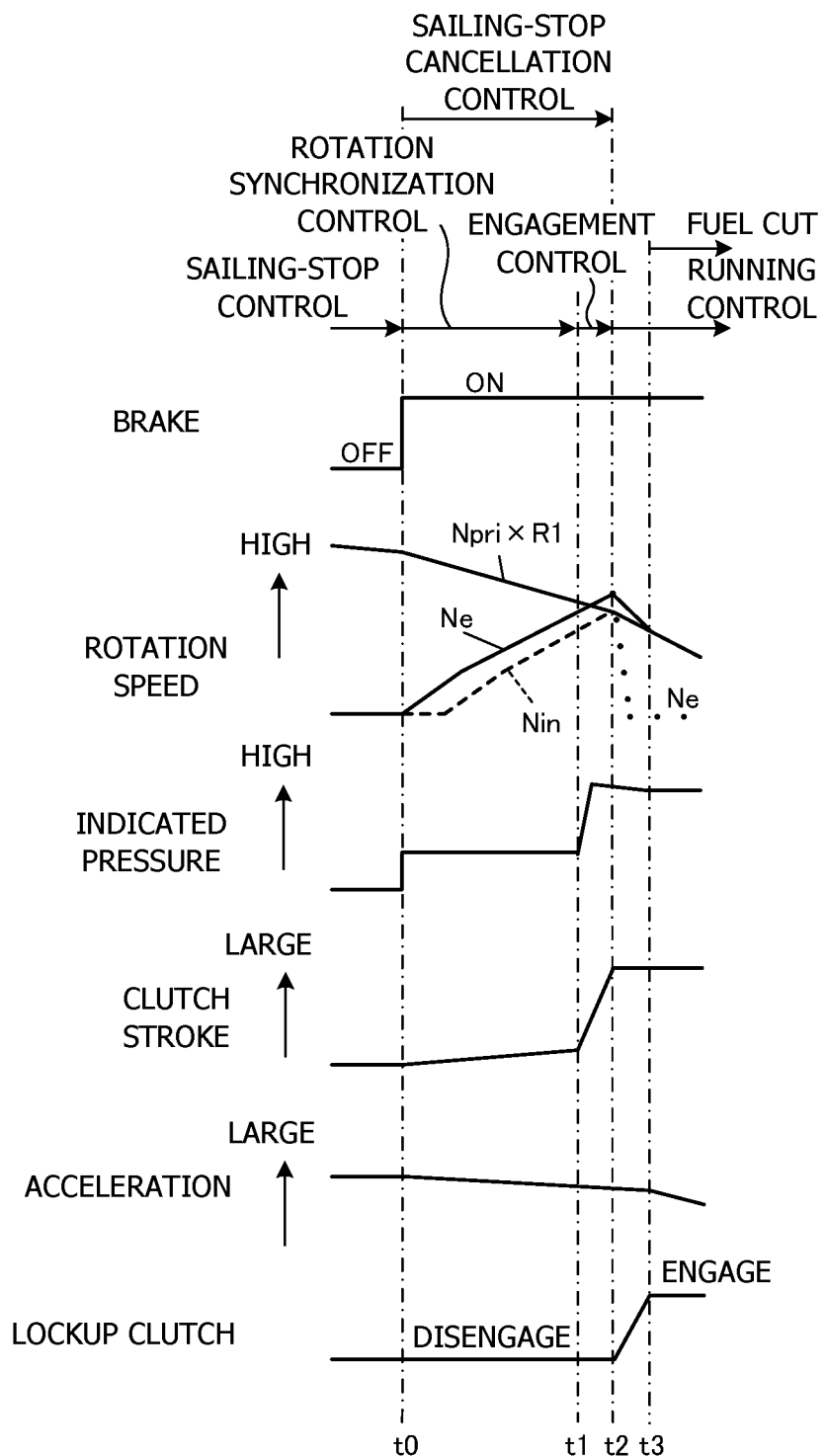
FIG. 3 is a time chart when the sailing-stop control is cancelled in a comparative example.

Subsequently, a case where the sailing-stop control is to be cancelled will be described by using a time chart. FIG. 3 is a time chart of a comparative example in which the brake pedal 42 is stepped on and the sailing-stop control is cancelled in a state where the lockup clutch 2a is disengaged.

In this comparative example, the rotation speed Nin on the input side of the forward/reverse switching mechanism 3 is detected, and the rotation synchronization of the forward clutch 3a is determined on the basis of the input-side rotation speed Nin, the primary rotation speed Npri, and the speed ratio R1 of the forward/reverse switching mechanism 3 when the forward clutch 3a is engaged. Specifically, if an equation (3) is satisfied, it is determined that the forward clutch 3a has rotation-synchronized.

$$|Nin-(R1 \times Npri)| \leq N3 \quad (3)$$

Reference character "N3" is a threshold value set in advance and is set so that occurrence of the engagement shock is suppressed when the forward clutch 3a is engaged in the state where the lockup clutch 2a is disengaged.

At time t0, if the brake pedal 42 is stepped on and it is determined that the sailing-stop control cancellation condition is met, the sailing-stop cancellation control is started, and the rotation synchronization control is started. As a result, the primary rotation speed Npri (a rotation speed obtained by multiplying the primary rotation speed Npri by the speed ratio R1 in FIG. 3 and the like) is lowered, while the engine 1 is started and thus, the engine rotation speed Ne and the input-side rotation speed Nin are increased. In FIG. 3, the engine rotation speed Ne is indicated by a solid line, and a part of the input-side rotation speed Nin is indicated by a broken line. In a range indicated by the broken line, since the lockup clutch 2a is disengaged, the input-side rotation speed Nin is lower than the engine rotation speed Ne.

Moreover, when the rotation synchronization control is started, a standby pressure is supplied to the forward clutch 3a as a preparation stage for quickly engaging the forward clutch 3a, and a clutch stroke of the forward clutch 3a is increased.

At time t1, if the equation (3) is satisfied and it is determined that the forward clutch 3a has rotation-synchronized, the rotation synchronization control is finished, and the engagement control is started. By means of execution of the engagement control, an indicated pressure of the forward clutch 3a rapidly rises, the clutch stroke increases, and the forward clutch 3a is engaged.

At time t2, since the engagement control is finished, the sailing-stop cancellation control is finished, and the normal running control is started. When the forward clutch 3a is engaged, the engagement of the lockup clutch 2a is started. At the time t2 and after, the input-side rotation speed Nin matches the rotation speed obtained by multiplying the primary rotation speed Npri by the speed ratio R1 of the forward/reverse switching mechanism 3 when the forward clutch 3a is engaged.

As in the comparative example, when the brake pedal 42 is stepped on, if the lockup clutch 2a is engaged after the engagement of the forward clutch 3a, the driven machine such as the alternator 7 located closer to an upstream side than the torque converter 2 cannot be driven by the rotation transmitted from the driving wheel until the lockup clutch 2a is engaged.

In FIG. 3, the engine rotation speed Ne when the fuel cut is executed immediately after the engagement of the forward clutch 3a in the state where the lockup clutch 2a is not engaged is indicated by a dotted line. If the fuel cut is executed in the state where the lockup clutch 2a is not engaged, the engine rotation speed Ne is rapidly decreased by the fuel cut and thus, alternator regeneration cannot be carried out.

In the comparative example, the alternator regeneration can be carried out at time t3 and after when the lockup clutch 2a is engaged, but the alternator regeneration cannot be carried out between the time t2 and the time t3.

Figure 4:
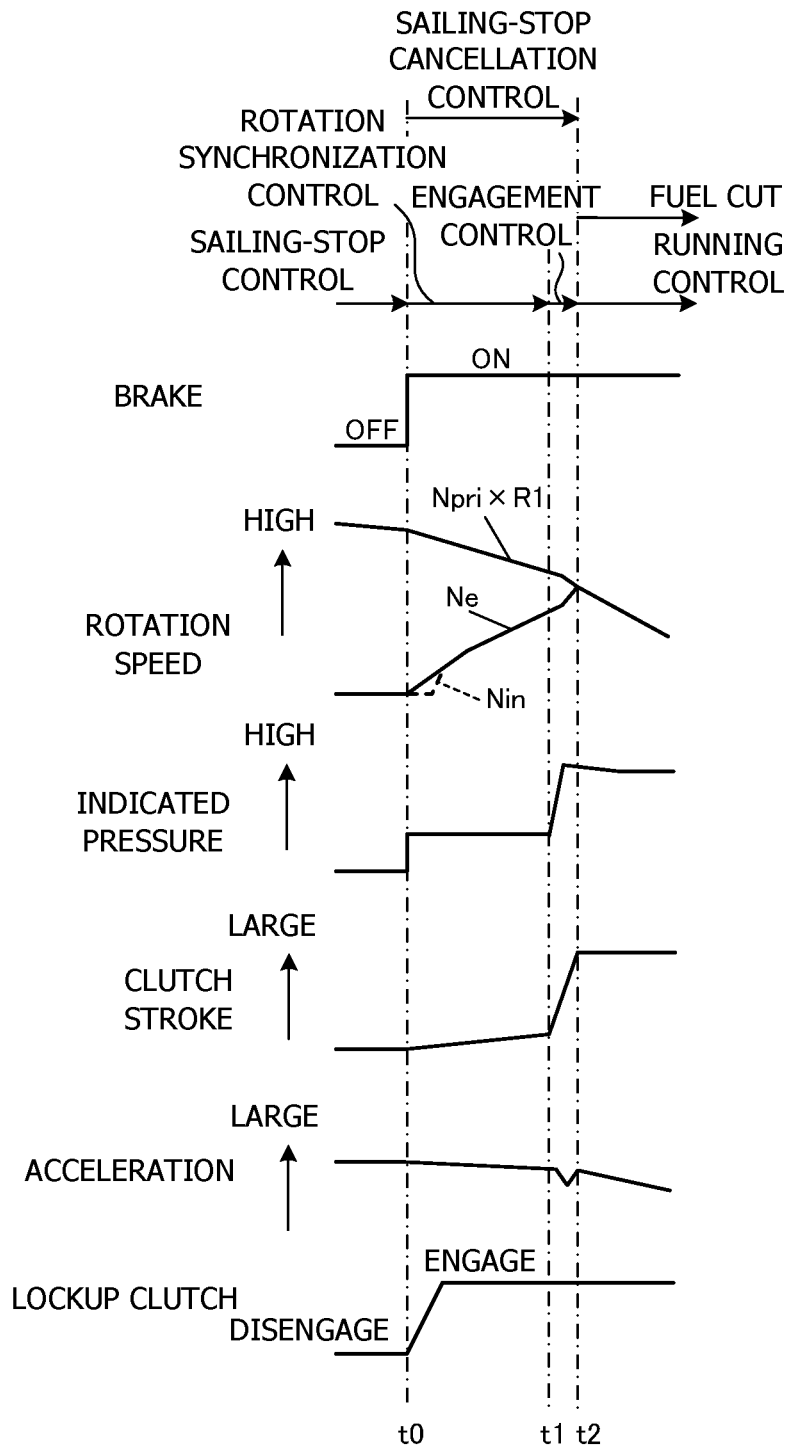
FIG. 4 is a time chart when the sailing-stop control is cancelled in a first example.

On the other hand, as a first example of this embodiment, a case where the lockup clutch 2a is engaged and the rotation synchronization is executed after the sailing-stop cancellation condition is met, and the forward clutch 3a is engaged will be described by using the time chart in FIG. 4.

At the time t0, when the brake pedal 42 is stepped on and it is determined that the sailing-stop control cancellation condition is met, engagement of the lockup clutch 2a is started, the sailing-stop cancellation control is started, and the rotation synchronization control is started. As a result, the primary rotation speed Npri is lowered, the engine rotation speed Ne and the input-side rotation speed Nin increase. When the lockup clutch 2a is engaged, the input-side rotation speed Nin is matched with the engine rotation speed Ne.

Moreover, since the standby pressure is supplied to the forward clutch 3a, the clutch stroke of the forward clutch 3a is increased.

At the time t1, if the equation (3) is satisfied and it is determined that the forward clutch 3a has rotation-synchronized, the rotation synchronization control is finished, and the engagement control is started. As a result, the forward clutch 3a is engaged. When the lockup clutch 2a is engaged and the forward clutch 3a is engaged, if the rotation synchronization is determined under the condition similar to that in FIG. 3 where the lockup clutch 2a is not engaged, there is no slip by the torque converter 2 and the engine 1 acts as a load and thus, a pulling shock (engagement shock) occurs when the forward clutch 3a is engaged.

At the time t2, since the engagement control is finished, the sailing-stop cancellation control is finished, and the normal running control is started. Here, since the lockup clutch 2a is already in the engaged state when the running control is started, the fuel cut can be made immediately after the running control is started, and alternator regeneration can be carried out.

As described above, if the rotation synchronization is determined under the same condition as that in the state where the lockup clutch 2a is disengaged, the pulling shock occurs when the forward clutch 3a is engaged, but by engaging the lockup clutch 2a, by executing the rotation synchronization, and by engaging the forward clutch 3a, the alternator regeneration can be started quickly.

Figure 5:
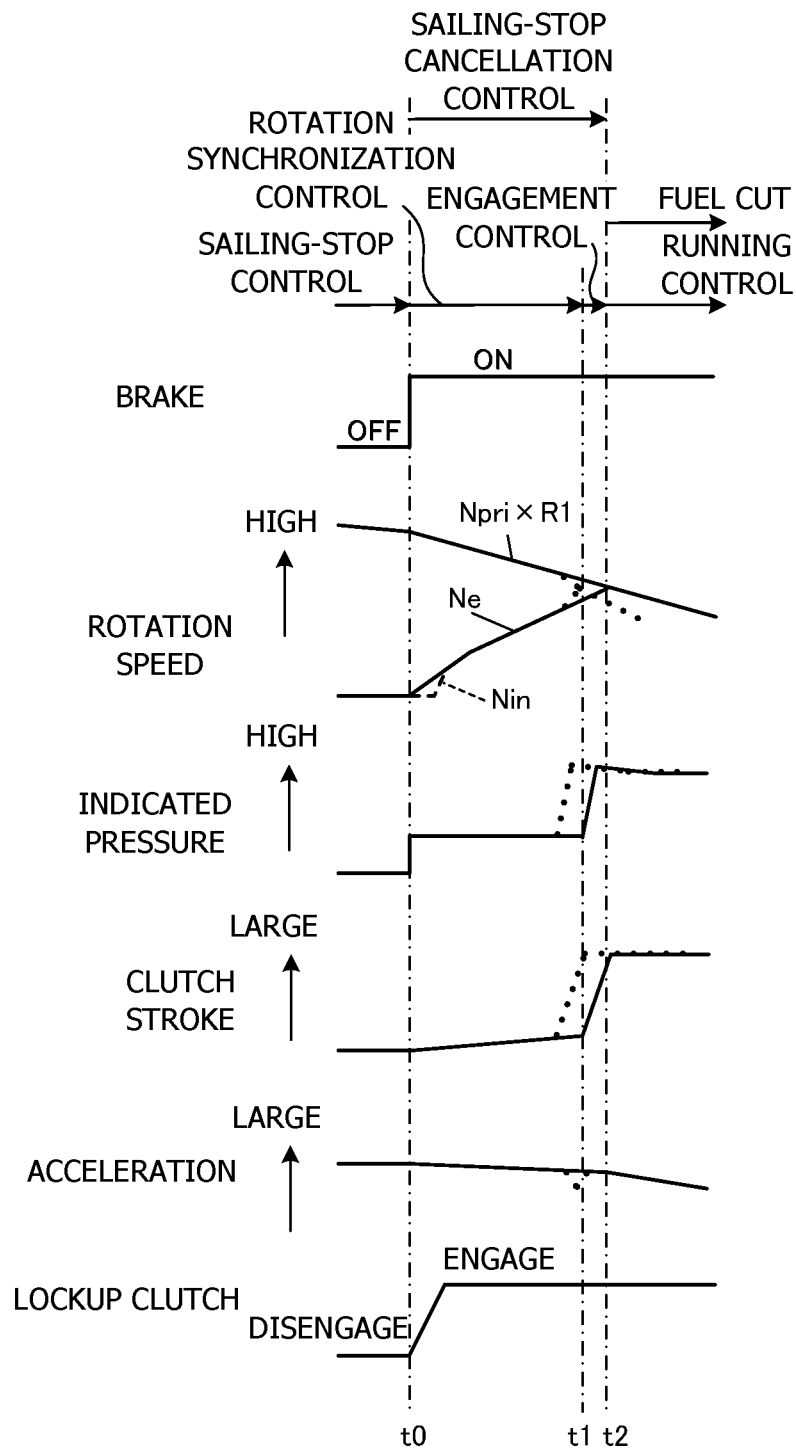
FIG. 5 is a time chart when the sailing-stop control is cancelled in a second example.

Subsequently, a case according to a second example of this embodiment will be described by using a time chart in FIG. 5. In FIG. 5, a part of changes of the rotation speed and the like in FIG. 4 is indicated by a dotted line for explanation.

At the time t0, when the brake pedal 42 is stepped on and it is determined that the sailing-stop control cancellation condition is met, engagement of the lockup clutch 2a is started, the sailing-stop cancellation control is started, and the rotation synchronization control is started. As a result, the primary rotation speed Npri is lowered, and the engine rotation speed Ne and the input-side rotation speed Nin increase. When the lockup clutch 2a is engaged, the input-side rotation speed Nin is matched with the engine rotation speed Ne.

Moreover, since the standby pressure is supplied to the forward clutch 3a, the clutch stroke of the forward clutch 3a is increased.

At the time t1, if the equation (1) is satisfied and it is determined that the forward clutch 3a has rotation-synchronized, the rotation synchronization control is finished, and the engagement control is started. As a result, the forward clutch 3a is engaged.

Here, in the second example, as a threshold value at which the rotation synchronization is determined in the state where the lockup clutch 2a is engaged, the first threshold value N1 different from the second threshold value N2 for determination of the rotation synchronization in the state where the lockup clutch 2a is disengaged is set, or more specifically, the first threshold value N1 is made smaller than the second threshold value N2. As a result, the rotation synchronization can be determined in the state where the lockup clutch 2a is engaged, and even if the forward clutch 3a is engaged, occurrence of the pulling shock can be suppressed.

An effect of the embodiment will be described.

When the sailing-stop control is to be cancelled, if the brake pedal 42 is stepped on, the forward clutch 3a is engaged in the state where the lockup clutch 2a is engaged. As a result, after the sailing-stop control is cancelled and the forward clutch 3a is engaged, the rotation of the driving wheel can be transmitted to the driven machine such as the alternator 7 and the mechanical oil pump 6m in an early stage, and alternator regeneration, hydraulic pressure supply by the mechanical oil pump 6m and the like can be started quickly, whereby electricity efficiency can be improved. Moreover, the fuel cut of the engine 1 executed by stepping-on of the brake pedal 42 can be started quickly, whereby fuel efficiency can be improved.

When the sailing-stop control is to be cancelled, if the brake pedal 42 has not been stepped on, the forward clutch 3a is engaged in the state where the lockup clutch 2a is disengaged. As a result, the torque converter 2 is in a converter state when the forward clutch 3a is engaged, and occurrence of the engagement shock can be suppressed.

By executing the rotation synchronization control when the sailing-stop control is to be cancelled, the engagement shock when the forward clutch 3a is engaged can be suppressed. In this embodiment, a sensor for detecting the input-side rotation speed Nin of the forward/reverse switching mechanism 3 is not provided, and the rotation synchronization is determined by using the engine rotation speed Ne and the primary rotation speed Npri.

In such a case, even if a rotation speed difference between the engine rotation speed Ne and the primary rotation speed Npri is the same, a rotation speed difference between before and after the forward clutch 3a, that is, a rotation synchronization state is different depending on whether the lockup clutch 2a is engaged or disengaged.

In this embodiment, the threshold value for determining the rotation synchronization is changed depending on whether the lockup clutch 2a is engaged or disengaged. As a result, the rotation synchronization can be determined accurately regardless of the state of the lockup clutch 2a, and occurrence of the engagement shock when the forward clutch 3a is engaged can be suppressed.

Specifically, the first threshold value N1 at which the rotation synchronization is determined in the state where the lockup clutch 2a is engaged is made smaller than the second threshold value N2 at which the rotation synchronization is determined in the state where the lockup clutch 2a is disengaged. As a result, occurrence of the engagement shock when the forward clutch 3a is engaged can be suppressed regardless of the state of the lockup clutch 2a.

When the brake pedal 42 is stepped on and the sailing-stop control is to be cancelled, too, the engine 1 needs to be started in order to execute the rotation synchronization control and thus, when the sailing-stop control is to be cancelled, the engine 1 is started. Then, after it is determined that the forward clutch 3a has rotation-synchronized and the forward clutch 3a is engaged, the fuel injection to the engine 1 is stopped and the fuel cut is carried out and then, the engine 1 is stopped again. As a result, occurrence of the shock when the forward clutch 3a is engaged is suppressed, and fuel efficiency can be improved.

In addition to the constitution of the aforementioned embodiment, an accumulator may be provided in an oil path for supplying the hydraulic pressure to the forward clutch 3a, for example. Alternatively, a dish plate may be provided between a piston for engaging the forward clutch 3a in accordance with the hydraulic pressure and a plate.

In the aforementioned embodiment, the automatic transmission 15 having the forward/reverse switching mechanism 3 arranged on a front stage or on an upstream side of the continuously variable transmission (variator) 4 is described, but it may be applied to an automatic transmission having a sub-transmission mechanism arranged on a rear stage or on a downstream side of the continuously variable transmission 4. A power transmission mechanism is a concept including the forward/reverse switching mechanism 3, the sub-transmission mechanism, and other power transmission mechanisms. Moreover, a main transmission mechanism constituting the automatic transmission 15 is not limited to the belt continuously variable transmission 4 but may be a toroidal continuously variable transmission, and it is not limited to the continuously variable transmission but may be a stepped transmission.

In the aforementioned embodiment, as a method for determining whether the forward clutch 3a has rotation-synchronized or not, the equation (1) and the equation (2) are used, but determination may be made from a viewpoint of a speed ratio by an equation (4) and an equation (5), for example.

$$|R1-Ne/Npri| \leq N4 \qquad (4)$$

$$|R1-Ne/Npri| \leq N5 \qquad (5)$$

Reference character "N4" is a fourth threshold value set in advance and is a value at which it can be determined that occurrence of the engagement shock can be suppressed when the forward clutch 3a is engaged in the state where the lockup clutch 2a is engaged. Reference character "N5" is a fifth threshold value set in advance and is a value at which it can be determined that occurrence of the engagement shock can be suppressed when the forward clutch 3a is engaged in the state where the lockup clutch 2a is disengaged and is larger than N4.

A method for determining whether the forward clutch 3a has rotation-synchronized or not is not limited to the equation (1), the equation (2), the equation (4), and the equation (5) but it is only necessary that the rotation synchronization is determined accurately and occurrence of the engagement shock can be suppressed when the sailing-stop control is cancelled.

In the aforementioned embodiment, the sailing-stop control is described as an example of the neutral running control. However, the neutral running control may be sailing control, for example, other than the sailing-stop control. That is, the aforementioned control can be applied if the neutral cancellation condition is met and the forward clutch 3a is engaged during the neutral running with the automatic transmission 15 in the neutral state.

The sailing control is executed by the transmission controller 11 and the engine controller 10 when the sailing forming condition is met. The sailing forming conditions are the following (a) to (d), for example. During the sailing control, the engine 1 which is a driving source is not stopped:

(a) The shift lever 40 is at the D range.
(b) The vehicle speed VSP is not lower than the second predetermined vehicle speed V2.
(c) The accelerator pedal 41 has not been stepped on.
(d) The brake pedal 42 has not been stepped on.

Here, the second predetermined vehicle speed V2 is a low vehicle speed lower than the first predetermined vehicle speed V1.

The sailing forming condition is met when all the conditions (a) to (d) are satisfied and is not met if any one of (a) to (d) is not satisfied. Moreover, the sailing cancellation condition is that any one of (a) to (d) is not met during the sailing control, for example, but the sailing forming condition and the sailing cancellation condition may be different conditions.

In the aforementioned embodiment, the lockup clutch 2a is disengaged during the sailing-stop control, but if the sailing-stop condition is met in the state where the lockup clutch 2a is engaged, the state where the lockup clutch 2a is engaged during the sailing-stop control may be maintained. As a result, there is no need to engage the lockup clutch 2a when the sailing-stop control is cancelled, the number of engaging times of the lockup clutch 2a can be reduced, and durability of the lockup clutch 2a can be improved.

If such neutral running control (sailing-stop control) is to be executed, if the predetermined neutral running control cancellation condition is met, the lock up clutch 2a is disengaged, and the forward clutch 3a is engaged in the state where the lockup clutch 2a is disengaged.

The "predetermined neutral running control cancellation condition" is not limited, but at least one of the following (a) to (c) conditions can be included, for example. As a result, since the forward clutch 3a is engaged in the state where the lockup clutch 2a is disengaged, the engagement shock of the forward clutch 3a can be reduced.

(a) The accelerator pedal 41 is stepped on, and the accelerator pedal opening APO is smaller than the predetermined opening APO1 (0<APO<APO1).

(b) The accelerator pedal 41 is stepped on, and the accelerator pedal opening APO is not smaller than the predetermined opening APO1 (APO1≤APO).

(c) The vehicle speed VSP is less than the first predetermined vehicle speed V1 (VSP<V1).

A condition other than (a) to (c) can be added as a neutral running control cancellation condition, and the added condition (d) in that case is whether the road has a predetermined gradient or more (entering an ascending road or not) or a gear position is changed to a low-speed range (L range, S range) or not, for example. And when any one of the conditions (a) to (d) is met during the neutral running control, it is determined that the neutral running control cancellation condition is met.

To include at least the (a) condition as the predetermined neutral running control cancellation condition is preferable from a viewpoint of prevention of the engagement shock.

In the aforementioned embodiment, the case where the engine 1 is a driving source is described. However, the driving source is not limited to the engine 1 but may be a motor, for example, or a combination of the engine 1 and the motor.

In the aforementioned embodiment, the case where the transmission controller 11 and the engine controller 10 are constituted as separate controllers is described. However, functions of the transmission controller 11 and the engine controller 10 can be integrated and constituted as a single controller. Moreover, at least either one of the transmission controller 11 or the engine controller 10 may be constituted by a plurality of controllers.

Forms derived from the aforementioned explanation other than those described in claims will be cited below.

In a vehicle having a driving source and a driven machine driven by the driving source, a control device for an automatic transmission connected to the driving source and adapted to control the automatic transmission, having a torque converter provided closer to a downstream side of a power transmission path than the driving source and the driven machine and having a lockup clutch and an engaging element provided closer to the downstream side of the power transmission path than the torque converter and disposed capable of shutting off transmission of power through the automatic transmission, in which neutral running control for bringing the automatic transmission into a power shut-off state when a predetermined neutral running condition is met is executed and at cancellation of the neutral running control in a state where the lockup clutch is disengaged when the brake pedal is stepped on, the engaging element is engaged in a state where the lockup clutch is engaged during running of a vehicle.

A control device for an automatic transmission in which the engaging element is engaged after engagement of the lockup clutch at the cancellation of the neutral running control.

A control device for an automatic transmission in which, if the neutral running control is to be cancelled in a state where the brake pedal is not stepped on, the state where the lockup clutch is disengaged is maintained.

A control device for an automatic transmission which maintains a state where the lockup clutch is engaged during the neutral running control if the lockup clutch is in the engaged state when the neutral running condition is met.

The embodiment of the present invention has been described above, but the explanation of the aforementioned embodiment merely illustrates a part of an application example of the present invention and is not intended to limit the technical scope of the present invention to the specific configuration of the aforementioned embodiment.

This application claims a priority based on Japanese Patent Application No. 2016-019762 filed with the Japanese Patent Office on Feb. 4, 2016, the entire contents of which is incorporated herein by reference.

The invention claimed is:

1. A device of controlling a vehicle having:
a driving source;
a driven machine driven by the driving source; and
an automatic transmission having a torque converter provided downstream of the driving source and the driven machine in a power transmission path and having a lockup clutch, and an engaging element provided downstream of the torque converter in the power transmission path, the device comprising:
a control unit adapted to execute rotation synchronization of the engaging element in a state where the lockup clutch is engaged if a brake pedal is stepped on during neutral running control in which the automatic transmission is brought into a power shut-off state during running of the vehicle, and to start engagement of the engaging element when the rotation synchronization of the engaging element is finished.

2. The device according to claim 1, wherein the driven machine is an alternator or a mechanical oil pump.

3. The device according to claim 1, wherein
the control unit maintains the state where the lockup clutch is engaged during the neutral running control if the lockup clutch is in an engaged state before the neutral running control.

4. The device according to claim 1, wherein
the control unit engages the engaging element in a state where the lockup clutch is disengaged if a predetermined neutral running control cancellation condition is met.

5. The device according to claim 4, wherein
the control unit executes rotation synchronization of the engaging element when the engaging element is engaged from a state where the neutral running control is executed, and determines the rotation synchronization when the engaging element is engaged in a state where the lockup clutch is disengaged and the rotation synchronization when the engaging element is engaged in a state where the lockup clutch is engaged with different threshold values.

6. The device according to claim 5, wherein a first threshold value at which the rotation synchronization is determined when the engaging element is engaged in the state where the lockup clutch is engaged is smaller than a second threshold value at which the rotation synchronization is determined when the engaging element is engaged in the state where the lockup clutch is disengaged.

7. The device according to claim 1, wherein the control unit starts, if the driving source is stopped during the neutral running control and the engaging element is engaged from the state where the neutral running control is executed, the driving source to execute rotation synchronization of the engaging element, and stops the driving source after the engaging element is engaged.

8. A method for controlling a vehicle having:
a driving source;
a driven machine driven by the driving source; and
an automatic transmission having a torque converter provided downstream of the driving source and the driven machine in a power transmission path and having a lockup clutch, and an engaging element provided downstream of the torque converter in the power transmission path, the method comprising:
executing rotation synchronization of the engaging element in a state where the lockup clutch is engaged if a brake pedal is stepped on during neutral running control in which the automatic transmission is brought into a power shut-off state during running of the vehicle; and
starting engagement of the engaging element when the rotation synchronization of the engaging element is finished.

9. A device of controlling a vehicle having:
a driving source;
a driven machine driven by the driving source; and
an automatic transmission having a torque converter provided downstream of the driving source and the driven machine in a power transmission path and having a lockup clutch, and an engaging element provided downstream of the torque converter in the power transmission path, the device comprising:
a control unit adapted to:
engage the engaging element in a state where the lockup clutch is engaged if a brake pedal is stepped on during neutral running control in which the automatic transmission is brought into a power shut-off state during running of the vehicle;
engage the engaging element in a state where the lockup clutch is disengaged if a predetermined neutral running control cancellation condition is met; and
execute rotation synchronization of the engaging element when the engaging element is engaged from a state where the neutral running control is executed, wherein the control unit determines the rotation synchronization when the engaging element is engaged in a state where the lockup clutch is disengaged and the rotation synchronization when the engaging element is engaged in a state where the lockup clutch is engaged with different threshold values.

10. A device of controlling a vehicle having:
a driving source;
a driven machine driven by the driving source; and
an automatic transmission having a torque converter provided downstream of the driving source and the driven machine in a power transmission path and having a lockup clutch, and an engaging element provided downstream of the torque converter in the power transmission path, the device comprising:
means for executing rotation synchronization of the engaging element in a state where the lockup clutch is engaged if a brake pedal is stepped on during neutral running control in which the automatic transmission is brought into a power shut-off state during running of the vehicle;
means for starting engagement of the engaging element when the rotation synchronization of the engaging element is finished.

* * * * *